F. Wicks,
Derrick.
No. 109,787. Patented Nov. 29, 1870.
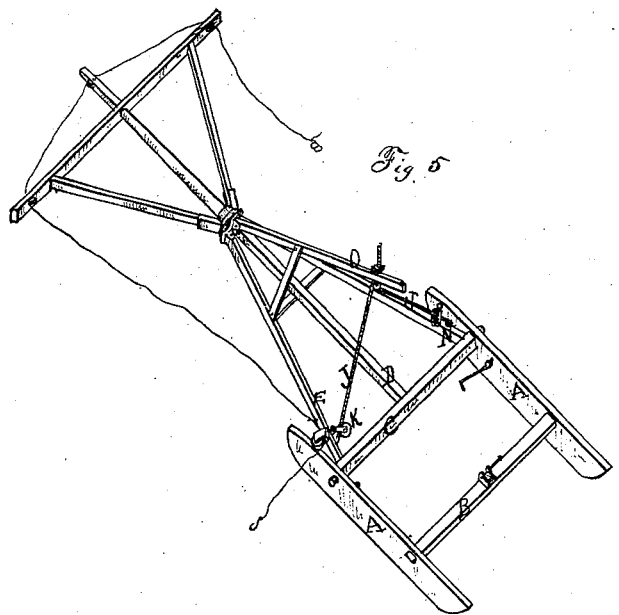
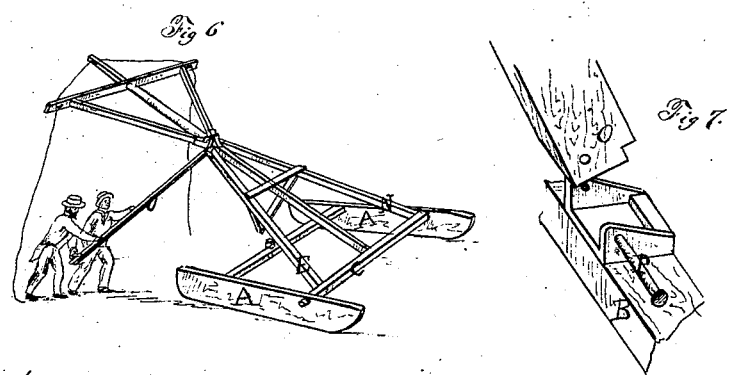
Witnesses
J. K. High
Jas H. Cowles
Frank Wicks
Inventor

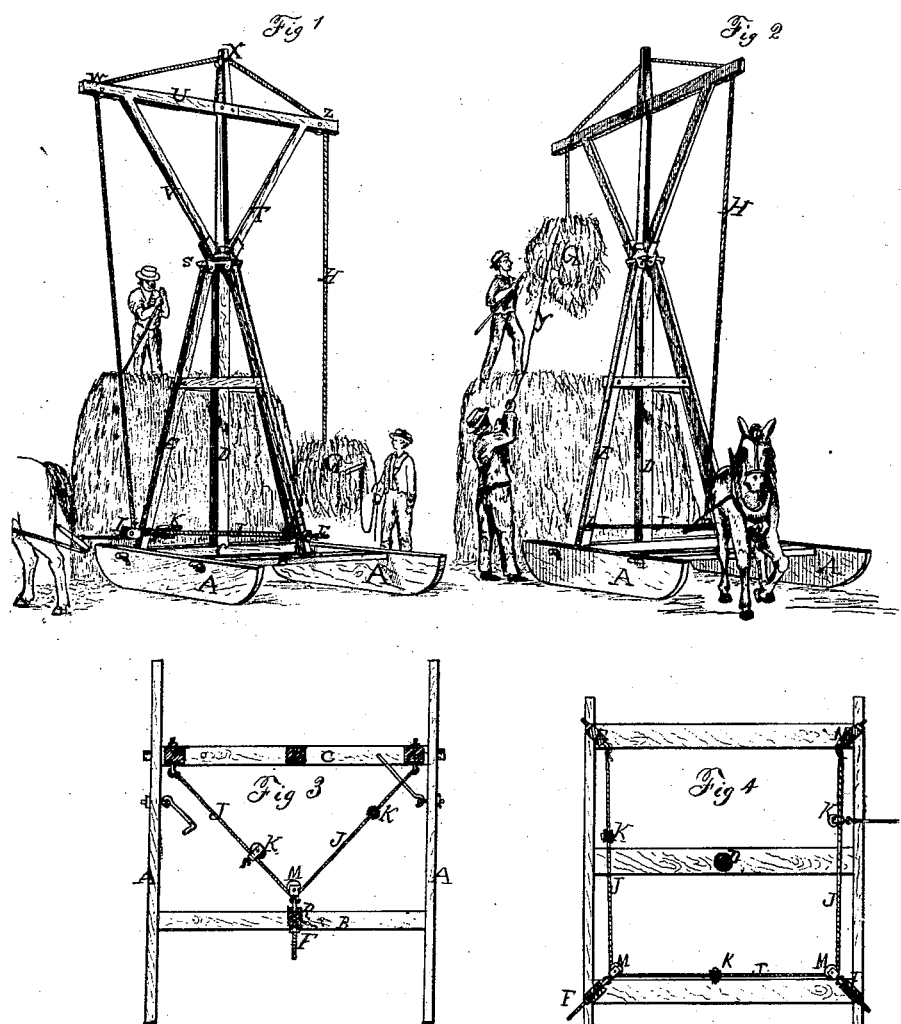

United States Patent Office.

FRANK WICKS, OF DECATUR, ILLINOIS.

Letters Patent No. 109,787, dated November 29, 1870.

IMPROVEMENT IN ELEVATORS.

The Schedule referred to in these Letters Patent and making part of the same.

*To all whom it may concern:*

Be it known that I, FRANK WICKS, of Decatur, in the county of Macon and State of Illinois, have invented certain new and useful Improvements in Hay-Elevators; and I do hereby declare the following to be a full, clear, and exact description of the construction and operation of the same, reference being had to the annexed drawing making a part of this specification.

Nature and Object of the Invention.

In elevating hay onto a load or stack, the hay has to be elevated first in a direct line, and, when elevated to a proper height, it is then swung around in a horizontal line over the point where it is intended to be deposited.

In the elevators heretofore in use, while in the act of elevating the loaded fork, the loaded fork takes the line of the hypothenuse of a triangle, which would cause it to be thrown against the side of the stack. This is caused by the loaded fork being at right angles with the line of draft, and the moment the hay is elevated from the ground, its tendency is to swing around into the line of draft, and, in doing so, it strikes the stack with great force.

It will be observed that this act of lifting brings the strain or power in a twisting or curved line on the elevator, which renders the central post liable to be broken, and also brings an extra amount of strain on the rope. It also throws an extra amount of labor on the operator of the fork, as he is obliged to use great effort in keeping it from dragging against the stack, and from swinging around too suddenly when raised to a plane above the top of the stack.

To obviate these difficulties is the nature and object of this invention.

Description of the Drawing.

Figure 1 is a view showing the position of the machine, the loaded fork just in the act of being raised, and the position of the horse.

Figure 2 shows the position of the horse, and the loaded fork just in the act of being discharged on the stack.

Figure 3 is a top view of the base of the machine with the ropes and traveling pulleys attached for controlling the motion of the upper revolving frame of the machine, and the ascending loaded fork, when the machine is made in tripod form.

Figure 4 is a top view of the base of the machine, with the ropes and traveling pulleys for governing the upper revolving frame of the machine, and the ascending loaded fork, when the machine is made with four posts.

Figure 5 shows the frame-work of the elevator turned over from the base, one of the posts being loosened.

Figure 7 shows the foot of the post and the means of attaching it, when it is desired to turn the frame-work down either way.

Figure 6 shows the frame-work turned forward over the base.

Similar letters of reference refer to similar parts.

A A are the runners or sills upon which is built the superstructure.

C and B are cross-beams extending from one runner to the other.

The posts E, D, N, and R rest upon these cross-pieces, of which posts, D is the central or main standard.

The three posts E, N, and R form a pyramidal-shaped form, and all are joined at the apex to a plate, S.

Through the center of this plate passes the central post D.

To the upper end of the central post is loosely attached the frame-work T V U, forming an inverted cone, with the apex resting upon the plate S. This frame-work readily revolves.

H is the rope passing over the pulleys I, W, X, and Z.

G is the loaded fork attached to the rope H; at the other end is attached the horse.

J J is a rope, fastened at one end at base of post E, fig. 3, passing around the pulley M; thence to the base of the post N, at which point it is permanently attached.

The pulley M is fastened to the foot of post R by means of the nut and screw F, and, by screwing up or unscrewing this nut, the rope J J is made more or less tight, at pleasure.

K K are traveling pulleys, moving along the rope J J, and to which the pulley I, fig. 1, is attached when in use.

In fig. 4 this rope is attached to an elevator, when four posts are used instead of three, with nut and screw at two posts, as shown at F F.

There is a pulley, K, on the rope J J between each two posts of the elevator.

Operation of the Machine.

The elevator is placed alongside of the place where the hay is to be deposited. The horse stands on the side opposite the point where the hay lies that is to be elevated onto the stack. The workman thrusts the fork into the hay; the horse then moves in a direct line with the loaded fork until the hay is partially elevated, when the horse moves to the right or left, and the pulley K simultaneously moves along the rope J, which causes the upper part of the frame-work to revolve or turn, and by the time the loaded fork is elevated sufficiently, it is also swung around over the place where it is to be deposited. Figs. 1 and 2 show this motion.

In fig. 1 the hay is just in the act of being elevated. In fig. 2 the horse (in this instance) has moved to the left, the pulley K traveling on the rope J from near the base of the post E to the base of post R, and in turn the upper revolving part of the machine has turned with the side movement of the horse.

It will be observed that I am enabled, by means of the rope J and traveling pulleys K K, to elevate the loaded fork and swing it around onto the stack simultaneously without causing any twisting or wrenching strain upon the frame-work; and also I relieve the workman of the extra and tedious labor of keeping the ascending loaded fork from dragging against the side of the stack by tugging and pulling at the guy-rope Y attached at the handle of the fork.

In the old method the upper part of the machine would be as in fig. 1, while the horse would draw as in fig. 2, at right angles, and the moment the hay G was raised from the ground, it would swing against the side of the stack.

It will be observed also that the same movement can be accomplished by the use of the ropes J J and pulleys K K, when the elevator is made with four posts, as in fig. 4.

The cross-piece C, to which is attached the central post D, and the posts N and E in the tripod form of the elevator, is made to revolve, and, by unfastening the base of the post O, the whole superstructure can be lowered, as seen in figs. 6 and 7.

The pulley I can be attached to any side of the machine, at pleasure, for the purpose of using the power on any side of the machine to suit the convenience of the work.

Claims.

What I claim as my invention, and desire to secure by Letters Patent, is—

1. In a hay-elevating machine, the rope J J, in combination with the traveling pulleys K K, pulley I, and rope H, constructed, arranged, and operating in the manner and for the purpose herein described.

2. The within-described arrangement and combination of the rope J J, posts E, D, and R, and traveling pulleys K K, for the uses and purposes herein set forth.

3. In a hay-elevator, the within described means and arrangement of ropes, traveling pulleys, and fixed pulleys, for changing the direction of the hay or weight to be raised and lowered, in the manner and for the purpose herein described.

FRANK WICKS.

Witnesses:
JAS. A. COWLES,
K. H. COTTLE.